United States Patent [19]

Schonlau et al.

[11] Patent Number: 4,828,329
[45] Date of Patent: May 9, 1989

[54] PRESSURE REGULATOR, IN PARTICULAR, FOR USE WITH PRESSURE FLUID-OPERABLE BRAKE SYSTEMS OF AUTOMOTIVE VEHICLES

[75] Inventors: Juergen Schonlau, Walluf; Alfred Birkenbach, Hattersheim; Ralf Harth, Oberursel, all of Fed. Rep. of Germany

[73] Assignee: Alfred Teves GmbH, Frankfurt am Main, Fed. Rep. of Germany

[21] Appl. No.: 132,384

[22] Filed: Dec. 15, 1987

[30] Foreign Application Priority Data

Dec. 22, 1986 [DE] Fed. Rep. of Germany ....... 3643925

[51] Int. Cl.4 .............................................. B60T 8/22
[52] U.S. Cl. ................................... 303/9.69; 303/22.8
[58] Field of Search .............. 188/195; 303/9.69, 22.5, 303/22.6, 22.7, 22.8

[56] References Cited

U.S. PATENT DOCUMENTS

| 4,040,674 | 8/1977 | Marcillaud | 303/22.7 |
| 4,325,581 | 4/1982 | Pickering | 303/22.7 |
| 4,700,990 | 10/1987 | Reynolds | 188/195 X |

Primary Examiner—Duane A. Reger
Attorney, Agent, or Firm—James B. Raden

[57] ABSTRACT

A pressure regulator for an automotive hydraulic braking system includes a housing provided with at least one pressure fluid inlet and one pressure fluid outlet with a connection between the inlet and outlet controlled by a valve unit driven by a driving force in proportion to an application force. The pressure regulator is substantially located in the interior of a suspension spring of a vehicle. To attain a load-sensitive pressure regulator of high precision, there is provided a fluid enclosed by a membrane which serves to transform the application force to the valve driving force. The driving force is applied to the pressure regulator valve unit through a partial face of the membrane in an opening direction of the valve.

3 Claims, 2 Drawing Sheets

PRESSURE REGULATOR, IN PARTICULAR, FOR USE WITH PRESSURE FLUID-OPERABLE BRAKE SYSTEMS OF AUTOMOTIVE VEHICLES

BACKGROUND OF THE INVENTION

The present invention relates to a pressure regulator and in particular to a pressure regulator for use with pressure fluid-operable brake systems.

Pressure regulators are employed, for example, in an automotive vehicle brake system to distribute the brake pressure between front and rear axles in response to load. The German Patent DE-OS No. 30 01 415 discloses a load-sensitive brake force regulator of this type, wherein a reduction in force is achieved through an enclosed rubber element which applies force to a transmission member through a predetermined proportion of its surface to actuate the valve in an opening direction. This device has a particular shortcoming. Namely, although due to the load exerted on the vehicle suspension spring, the rubber element does move the valve means in the opening direction, no return movement for closing the valve is possible. A further shortcoming of this device is found in the fact that the rubber element, in the course of time, changes its characteristic thereby precluding precise regulation.

SUMMARY OF THE INVENTION

It is, therefore, the object of the present invention to improve the regulating precision of a pressure regulator of the afore-described type.

This object is achieved by a structure according to the present invention. According to the invention, the pressure regulator includes a valve means that is always driven by a driving force exactly in proportion to the input force. Also, during pressure decrease, a substantially hysteresis-free characteristic is provided.

Also, the valve unit includes a valve seat located in a regulating piston and a spring-loaded valve closing member associated therewith, so that high-precision regulation is achieved.

According to a preferred embodiment of the invention, the membrane is in the form of a roll-type membrane having radially located circumferential bulges between which bulges all parts which are relatively displaceable with respect to one another are located. Force is applied to the membrane, through a spring seat, a supporting ring and a piston support plate. The roll-type membrane is of such a configuration as to permit satisfactory rolling movements precluding deformation and damage to the membrane.

To enable switch-over pressures to be adjusted precisely to different requirements, a regulating spring is provided between the housing and the piston support plate. Advantageously, this enables the load-sensitive switch-over pressure to be adjusted precisely to the specific requirements of the automotive vehicle.

According to another feature, undesirable frictional influence exerted on the regulating behavior is minimized by a slide ring provided between the spring seat and the supporting ring.

BRIEF DESCRIPTION OF THE DRAWING

The operation and advantageous features of the invention will become apparent from the following Detailed Description of a Preferred Embodiment of the invention with reference to the drawing, wherein.

DETAILED DESCRIPTION OF A PREFERRED EMBODIMENT

Figure 1:
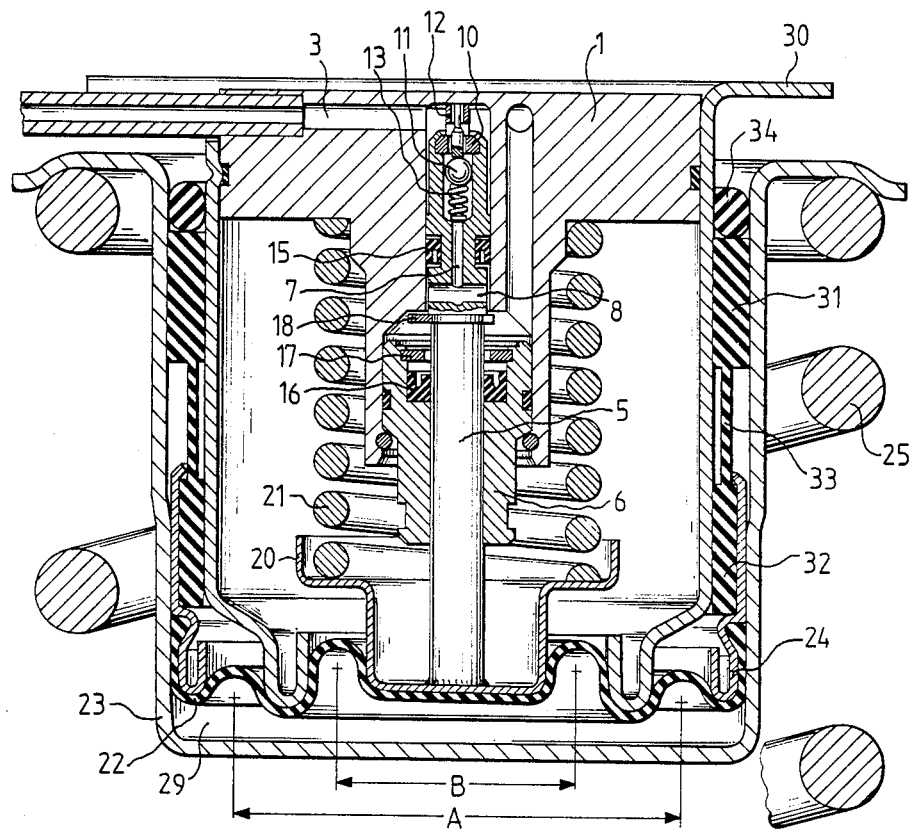
FIG. 1 is a longitudinal cross sectional view of a preferred embodiment of the invention showing details of a single-type regulator.

The pressure regulator shown in FIG. 1 includes a housing 1 having a stepped outer contour, so as to have enlarged and reduced diameter portions. It is provided with a stepped central port having a reduced diameter section and an enlarged diameter section and also having a connecting bore to an inlet 2 and a connecting bore to an outlet 3. The housing 1 is in communication with, i.e., fixed to, the suspended vehicle body. A regulating piston 5 is axially displaceable in the axial center port of the housing and, on the one hand, is sealingly disposed in the smaller diameter section of the central port and, on the other hand, is guided through a closure member 6 which member is fixed in the larger diameter section or step of the central port in pressure-tight manner by a snap ring. The end of the regulating piston 5 facing the outlet is provided with a stepped axial bore 7 in communication with a transverse bore 8. Communication between the inlet 2 and the outlet 3 is established through these two bores 7 and 8.

A valve seat 10 is conventionally affixed in pressure tight manner at the end of the stepped axial port 7 which faces the connecting port for the outlet 3. The valve seat 10 confines a valve closure member 11 in the form of a ball which is preloaded toward the valve seat by a valve spring 13 within the central step of the axial bore 7.

The valve seat 10, in part, protrudes from the control piston and includes a transverse port in the protruding section. The transverse port is in communication with the axial passage port of the valve seat in which is located an actuating pin 12. The axial passage port of the valve seat 10 and the actuating pin 12, respectively at the ends thereof facing the valve closure member 11, include a cross-sectional enlargement that prevents the actuating pin from dropping out of the passage.

Provided between the transverse bore 8 and the end of the regulating piston facing the outlet is a ring seal 15 disposed in a corresponding annular groove in the cylindrical surface of the regulating piston 5 against the housing 1. Within the closure member 6, the regulating piston 5 is sealed by another ring seal 16 which is restrained by a locking ring 17. The locking ring 17 cooperates with a stop ring 18 to limit the return stroke of the regulating piston 5. The stop ring 18 is provided between the lock ring 17 and the transverse port 8 on the regulating piston 5.

The end of the regulating piston 5 which protrudes from the housing 1, is welded to a piston support plate 20 which is a hat-shaped sheet metal part partly enclosing the protruding regulating piston end. A regulating spring 21 is disposed in the cup-shaped radially outer marginal area of the support plate 20. The regulating spring 21 is supported at the other end thereof on the outer step of the housing 1 formed between the enlarged and reduced diameter portions and is of a helical compression spring configuration. The piston support plate 20 through the outer bottom side thereof bears on and applies force to a membrane 22 which is configured as a roll-type membrane and which, at the radially outer edge thereof, is provided with a bead through which it is fixed to a spring seat 23 by means of a holding ring 24 having U-shaped end pieces bearing on the membrane. The cup-shaped spring seat 23 surrounds substantially the entire regulator. Force is applied to the externally bent flang-type edge of the seat 23 in the axial direction through a vehicle suspension spring 25. The other end of the spring 25 is supported on a non-suspended suspension part of the vehicle.

A supporting sleeve 30 sealed at one end thereof to the housing 1 is axially guided into the spring seat 23 and includes at the other end thereof, a U-shaped closing curve turned back in collar-type manner and bearing on the membrane 22. The sleeve 30 applies force to the membrane 22 which conforms to the closing curve. Trapped in a closed chamber 29 formed by the membrane 22 and the bottom of the spring set 23 is a suitable fluid medium, for example, a silicone oil. The membrane 22 between the U-shaped end pieces of the holding ring 24 and the support sleeve 30, and between the piston support plate 20 and the U-shaped end section of the support sleeve 30 is curvilinear and directionally bulged out from the bottom of the spring seat 23, thereby enabling the membrane to perform a roll-off movement in case of a relative movement between the respective parts. The annular face of the membrane 22 between the cylindrical section of the spring seat 23 and the end section of the support sleeve 30, can be selected within a predetermined range by tapering the support sleeve in this area so as to vary the driving force exerted on the valve means relative to the input force exerted by the suspension spring 25.

The cylindrical surface of the support sleeve 30, in part, is surrounded by a slide ring 31 disposed between the support sleeve 30 and the spring seat 23 to reduce the friction in case of movement of the spring seat relative to the support sleeve. The slide ring 31 comprises a second section 32 of a reduced wall thickness to which the holding ring 24 surrounding the said section 32 is secured. A central area 33 of the slide ring 31 has an even thinner wall thickness and thus provides a circumferentially extending recesses. To preclude ingress of water or dirt, the annular gap between spring seat 23 and support sleeve 30 is sealed by a gasket 34.

In non-pressurized condition of the brake system, the pressure regulator assumes the position as shown in the drawing. If the brake circuit is pressurized by a pressure fluid source through the connecting port from the inlet 2, the pressure fluid, through transverse bore 8, the axial bore 7 and the valve means 10, 11, which is maintained open through the actuating pin 12, is passed to the connecting port to the outlet 3 and into the brakes in communication therewith, respectively. Through the pressure exerted on the front face of the regulating piston 5, a force is generated tending to force the regulating piston out of the central port of the housing.

Once a predetermined distance is covered by the regulating piston 5, the actuating pin 12 is lifted off the housing 1 and thus is no longer able to keep the valve 10, 11 open. The valve closure member 11, through the force of the valve spring 13, is forced onto the valve seat 10 thereby blocking the passage between the inlet 2 and the outlet 3. The regulating piston 5, in its area between the piston support plate 20 and the stop ring 18, is of a smaller diameter than in the area between stop ring 18 and the end of the piston facing the outlet. Accordingly, in case of a further pressure build-up through the connecting port from the inlet, a force is generated on the regulating piston by way of which it is slightly forced back into the central port of the housing, with the actuating pin 12 accordingly reopening the valve 10, 11. During the pressure build-up, the regulating piston 5, hence, in quick sequence, moves forth and back, with the valve means 10, 11 permanently opening and closing. The outlet pressure is accordingly reduced from the inlet pressure in a ratio equal to the ratio of the surfaces to which pressure is applied.

The spring seat 23 is forced toward the housing 1 to a more or less large degree through the suspension spring 25, in response to the wheel load, with the fluid enclosed in the chamber 29 being pressurized in response to load. The pressure generated in chamber 29 is equal to the force exerted through the suspension spring 25 due to the wheel load divided by the cross-sectional area of face A.

This pressure causes a reaction force to be applied to the piston support plate and, hence, to the regulating piston, with the reaction force corresponding to the product of the pressure and the cross-sectional area of face B. Consequently, a reduction of the wheel load will cause a reduction in the driving force of the regulating piston 5. The control force is applied to the regulating piston 5 in a load-sensitive manner in the opening direction of the valve 10, 11. This results in an increase in the switch-over pressure which, through the selection of the spring rate of the regulating spring 21 and the relationship between the pressure surfaces A and B, can be adapted to the conditions required by a specific vehicle application.

In case of a pressure drop in the inlet, first the regulating piston 5 is shifted from the central port of the housing 1 to a degree causing the stop ring 18 to abut the lock ring 17 so that the outlet pressure is decreased by an increase in volume of the outlet chamber. Thereafter, the pressure decrease in the outlet is effected in that the excess pressure in the outlet displaces the valve closure member 11 against the force of the valve spring 13 thereby opening the valve 10, 11 until the valve 10, 11, through the actuating pin 12 then in abutment with housing 1, is held in the open position.

Figure 2:
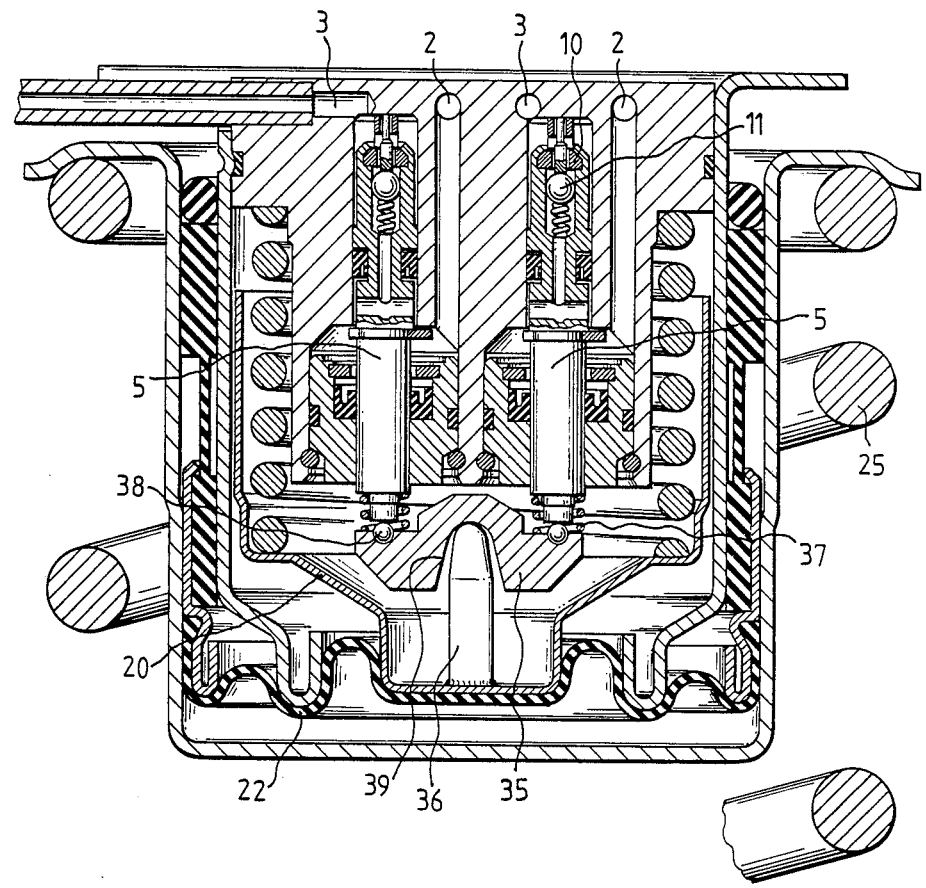
FIG. 2 is a longitudinal cross sectional view of an alternative embodiment of the invention showing details of a twin-type regulator.

The twin regulator as shown in FIG. 2, basically, is of the same construction and has the same operation so that, in the following, reference will only be made to the differences between the two forms of embodiment of the invention. In respect of parts corresponding to one another, identical reference characters have been selected in both Figures.

Housing 1, in the embodiment of FIG. 2, comprises two main ports each of which is provided one regulating piston 5 and each of which is connected to one connecting bore from the inlet 2 and one connecting bore to the outlet 3. The pressure application to the regulating piston 5 is not effected directly through the piston support plate 20 as in FIG. 1, but rather is effected through a distributor element 35 disposed in the form of a hinged plate on a plunger 36 fixed to the support plate 20.

The ends of the regulating piston 5 protruding from the housing 1, are stepped down toward the distributor element 35, with one end of a spring 37 being respectively supported on the step. The other end of the spring 37 applies pressure to the distributor element 35.

The distributor element 35 serves to balance closure path tolerances and permits a friction-free swinging movement of the distributor element 35. A ball 38 which acts as an intermediate element is provided between the regulating piston end and the distributor element 35. The plunger 36 is welded at one end to the piston support plate 20 and is generally conically shaped at its other end. A cup 39 is formed on the distributor element 35. The cup includes an internal generally conical portion sloped such that, in case of a failure of a brake curcuit - in which case the regulating piston 5 of the failed circuit remains in its initial position and the other piston is moved into the closure position of the valve 10, 11 - the two conical flanks of the plunger 36 and of the distributor element 35 strike one another and provide the entire driving force of plunger 36 to be transmitted to the circuit still intact thereby increasing the switch-over pressure of the intact circuit.

What is claimed is:

1. A pressure regulator assembly for a vehicle having a suspension spring and a sprung body, said assembly comprising an open-topped, cup-shaped spring seat adapted to be supported in the upper end of said suspension spring, a valve housing adapted to be fixedly mounted on said body to project coaxially downwardly into said spring seat, pressure responsive valve means in said housing including a reciprocable valve actuator projecting coaxially downwardly from said housing, a circular, flexible diaphragm fixedly and sealingly secured around its periphery to the inner side wall of said cup-shaped spring seat to define a sealed chamber between the lower surface of said diaphragm and the bottom of said seat, spring means resiliently biasing said actuator downwardly against the upper surface of said diaphragm, and a hollow cylindrical sleeve fixedly mounted on said housing in coaxial relationship therewith and having a rounded annular lower end engaged in a first annular recess in the upper surface of said diaphragm, said first recess being spaced radially inwardly from the periphery of said diaphragm and radially outwardly from that portion of said diaphragm engaged by said actuator.

2. The invention defined in claim 1 further comprising an annular holding ring fixedly secured to the inner side wall of said cup-shaped seat, an upwardly projecting peripheral bead on said diaphragm, and means at the lower end of said holding ring sealingly clamping said bead against the side wall of said seat and seated in a second annular recess in the upper surface of said diaphragm spaced radially outwardly from said first annular recess.

3. The invention defined in claim 2 further comprising slide ring means slidably engaged between said seat and said sleeve, and means at the upper end of said holding ring securing said slide ring to said holding ring.

* * * * *